United States Patent
Prosser et al.

(10) Patent No.: US 11,900,824 B2
(45) Date of Patent: *Feb. 13, 2024

(54) PREDICTIVE AIRCRAFT FLIGHT ENVELOPE PROTECTION SYSTEM

(71) Applicant: Gulfstream Aerospace Corporation, Savannah, GA (US)

(72) Inventors: Kevin Prosser, Savannah, GA (US); Thomas Landers, Savannah, GA (US); Abhishek Vaidya, Savannah, GA (US); Alborz Sakhaei, Savannah, GA (US); Blake Finlayson, Savannah, GA (US)

(73) Assignee: GULFSTREAM AEROSPACE CORPORATION, Savannah, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/295,124

(22) Filed: Apr. 3, 2023

(65) Prior Publication Data

US 2023/0245576 A1 Aug. 3, 2023

Related U.S. Application Data

(63) Continuation of application No. 16/552,629, filed on Aug. 27, 2019, now Pat. No. 11,651,699.

(Continued)

(51) Int. Cl.
*G08G 5/04* (2006.01)
*G05D 1/10* (2006.01)
(Continued)

(52) U.S. Cl.
CPC ............ *G08G 5/045* (2013.01); *G05D 1/106* (2019.05); *G08G 5/0086* (2013.01)

(58) Field of Classification Search
None
See application file for complete search history.

(56) References Cited

U.S. PATENT DOCUMENTS

2008/0208400 A1\* 8/2008 Bouchet ................. G01C 23/00
701/4
2010/0179760 A1\* 7/2010 Petrini ................... G08G 5/045
701/301

(Continued)

FOREIGN PATENT DOCUMENTS

CN 103354041 A 10/2013
CN 106530840 A 3/2017
(Continued)

*Primary Examiner* — Aniss Chad
*Assistant Examiner* — Mahmoud M Kazimi
(74) *Attorney, Agent, or Firm* — LKGLOBAL | Lorenz & Kopf, LLP

(57) ABSTRACT

The aircraft threat envelope protection system employs a threat envelope data structure in a computer-readable medium that stores at least one trigger condition for each of a plurality of different types of threats associated with the aircraft, and modeled using a common schema. A processor computes plural different projected trajectories representing different possible aircraft paths through spacetime. The processor associates at least some of the plurality of the threats to specific trigger points in spacetime along each of the projected trajectories. The processor will deprecate ones of the projected trajectories when they are deemed not viable to recover from a threat. The processor initiates an aircraft protective response when all projected trajectories but one have been deprecated and the aircraft is within a predetermined proximity to the closest trigger point in spacetime along the non-deprecated trajectory.

20 Claims, 4 Drawing Sheets

Related U.S. Application Data

(60) Provisional application No. 62/723,227, filed on Aug. 27, 2018.

(51) Int. Cl.
*G08G 5/00* (2006.01)
*G05D 1/00* (2006.01)

(56) References Cited

U.S. PATENT DOCUMENTS

2016/0247406 A1* 8/2016 Khatwa ................ B64D 45/04
2017/0132942 A1* 5/2017 Mere ...................... G01C 23/00

FOREIGN PATENT DOCUMENTS

| CN | 106548661 A | 3/2017 |
| CN | 107589754 A | 1/2018 |

* cited by examiner

PREDICTIVE AIRCRAFT FLIGHT ENVELOPE PROTECTION SYSTEM

CROSS-REFERENCE TO RELATED APPLICATION

This is a continuation of U.S. application Ser. No. 16/552,629, filed Aug. 27, 2019, which claims priority under 35 U.S.C. § 229 (e) to U.S. Provisional Application No. 62/723,227, filed Aug. 27, 2018, the contents of which are hereby incorporated herein by reference.

TECHNICAL FIELD

The present disclosure generally relates to aircraft flight envelope protection systems, and more particularly to aircraft flight envelope protection systems that model potential aircraft trajectories and test those trajectories for aircraft limit violations and terrain avoidance hazards.

BACKGROUND

This section provides background information related to the present disclosure which is not necessarily prior art.

Aircraft are designed to operate within certain operating speeds and loads on control surfaces of the aircraft. These operating limits are known as the flight envelope, outside of which there may be damage or loss of control of the aircraft. Additionally, aircraft must operate over flight trajectories that avoid collision with material objects such as ground terrain and other aircraft. In order to protect against operating outside of the flight envelope or colliding with other objects, conventional aircraft utilize many disparate protection or safety systems that each evaluate individual aspects of the aircraft to determine whether the aircraft is operating outside of the flight envelope or is likely to collide with the ground or other objects on the present flight path.

These conventional systems are deployed in a piecemeal fashion, each being dedicated to protection against one aspect of the flight envelope or against collision with one class of objects (ground collision being handled by a different system than in-air collision, for example). There is often very little, if any, interoperability between such systems. Indeed, many conventional single-function protection systems operate functionally unaware that other protection or safety systems even exist. This can result in multiple systems, with potentially overlapping responsibilities, each operating without awareness of the design assumptions that were engineered into the other systems.

For example, low speed protection may not be triggered when the speed is not close to stall even though the speed is slow enough to prevent an immediate climb. A ground proximity system may not be triggered because the aircraft may be on descent to a runway and the ground proximity system may assume that climb capability exists. Neither conventional system is aware of the other system's proximity to a threat and the assumptions that the other systems made regarding speed and altitude.

In another example of conventional system boundaries, conventional overspeed protection systems only work while the aircraft wings are near level. The conventional overspeed protection is suppressed at very high bank angles (e.g., inverted) because the conventional recovery pulls the nose up to help slow the aircraft, but can exacerbate the problem instead of alleviating the problem at the very high bank angles.

Essentially, these conventional systems utilize precomputed "rules of thumb" to determine when an alert must be generated to alert the crew of an impending envelope excursion. For cases markedly different from the rule-of-thumb design point, the conventional system performance degrades. For example, a conventional ground proximity warning system typically uses radio altimeter altitude and rate of change to determine timing of the pull-up alert. Under nominal conditions, the alert will sound at a point that is not too early as to be a nuisance but early enough for the pilot to react and initiate a climb that will clear the rising terrain. The accuracy of this method is dependent on a couple factors. First, the terrain in front of the aircraft must match reasonably well with the terrain currently being measured. The conventional system looks at current terrain clearance and rate of change of that terrain, but if the terrain slope changes (e.g., rises more rapidly), the conventional system may not be accurate.

Additionally, the accuracy of these conventional systems depends on the ability of the aircraft in its current configuration being able to fly the expected profile. The conventional systems assume the aircraft is capable of flying the recovery trajectory to be able to pull up above the rising terrain. These conventional systems do not consider high altitude terrain where climb performance is significantly less than at sea level and do not consider gross weight effects or engine failure conditions.

Furthermore, these conventional systems are often disabled for landing, based on whether the landing gear is down or by pilot command. Disabling the systems for landing, however, causes the aircraft to lose flight envelope protection during the landing.

Accordingly, there is much room for improvement, particularly to provide greater flight envelope and collision avoidance protection during flight and during take-off and landing. These and other desirable features and characteristics of the present disclosure will become apparent from the subsequent detailed description and the appended claims, taken in conjunction with the accompanying drawings and the foregoing technical field and background.

SUMMARY

Instead of providing piecemeal protection against a plurality of individual hazards, the disclosed predictive aircraft flight envelope protection system provides full-envelope protection covering all threats collectively and covering the full extent of the flight envelope, not restricted to just the heart of the envelope. The disclosed predictive system employs a kinematic-energy model that reduces the full-envelope of threats to a common schema or common denominator. Using the kinematic-energy model the processor calculates plural different predicted trajectories, representing different possible threat recovery flight trajectories. The model efficiently uses a minimal set of fundamental variables that capture the aircraft g-forces and energy state, from which the processor can determine (a) where the aircraft will be at a future time along each trajectory and (b) what it's energy state will be at that future time. The processor continually assesses each of the predictive trajectories for viability, deprecating trajectories that cease to be viable options, until one predictive trajectory remains. The processor automatically initiates recovery action by an associated autopilot system when the aircraft reaches a trigger point representing the first threat the aircraft will encounter along this trajectory. In other words, the protection system automatically takes action when the first threat in the last available trajectory is reached.

The disclosed aircraft flight envelope protection system, employs a threat envelope data structure embodied in a computer-readable medium that stores at least one trigger condition for each of a plurality of different types of threats associated with the aircraft. Each of the plurality of different types of threats is parameterized using a common schema. The common schema is chosen to express all flight envelope transgression threats and collision threats in fundamental terms of a force affecting trajectory of the aircraft and an energy state of the aircraft.

With access to this data structure, a processor is programmed to compute plural different projected trajectories representing different possible aircraft paths through spacetime. These trajectories are expressed in terms used by the common schema. The processor is additionally programmed to associate at least some of the plurality of trigger conditions obtained from the threat envelope data structure to specific trigger points in spacetime along each of the projected trajectories. These different projected trajectories are computed based on predefined recovery strategies that operators may typically employ when avoiding a threat. To avoid collision with a mountain, for example, an operator might choose among three trajectories: pull up, bank left or bank right. Thus such trajectories are among the predefined recovery strategies that are programmed into the processor. While the disclosed system has been specifically illustrated in the context of an aircraft, where the operators are typically pilots onboard the aircraft, the disclosed techniques can be applied in other types of craft, such as unmanned aerial vehicles (UAVs), where the operator is controlling the craft remotely. Moreover, the disclosed techniques can also be applied to other types of craft (e.g., submarines, terrestrial vehicles, etc.).

While the processor computes plural different trajectories, the processor is programmed to deprecate ones of the projected trajectories during times when such ones are computed as not viable to recover from a threat. Thus in the above example, if the pull up trajectory becomes not viable because there is insufficient time to employ that maneuver effectively, it will be deprecated and not used unless and until conditions change to render it viable again.

The disclosed system is uniquely designed nonintrusive. Thus the system is capable of suppressing alert warnings or automatic evasive maneuvers against predicted threats so long as the pilot has one or more viable (not deprecated) recovery trajectory available. However, the processor is programmed to initiate an aircraft protective response (issuing alert warnings and/or initiating automatic evasive maneuvers) when all projected trajectories but one have been deprecated and the aircraft is within a predetermined proximity to the closest trigger point in spacetime along the non-deprecated trajectory. In this way, full-envelope protection against a wide range threats is achieved while significantly reducing the likelihood of annoying false alarms.

The processor is programmed to continuously compute the projected trajectory solutions and populate those trajectories with all applicable trigger points, so that the first threat encountered in the last available (nondeprecated) trajectory will initiate the aircraft protective response.

In one aspect the disclosed aircraft threat envelope protection system includes a threat envelope data structure embodied in a computer-readable medium that stores at least one trigger condition for each of a plurality of different types of threats associated with the aircraft. Each of the plurality of different types of threats is parameterized using a common schema. A processor is programmed to compute plural different projected trajectories representing different possible aircraft paths through spacetime, wherein the processor is programmed to associate at least some of the plurality of trigger conditions obtained from the threat envelope data structure to specific trigger points in spacetime along each of the projected trajectories.

The processor is further programmed to deprecate ones of the projected trajectories during times when such ones are computed as not viable to recover from a threat, and to initiate an aircraft protective response when all projected trajectories but one have been deprecated and the aircraft is within a predetermined proximity to the closest trigger point in spacetime along the non-deprecated trajectory.

BRIEF DESCRIPTION OF THE DRAWINGS

The drawings described herein are for illustrative purposes only of selected embodiments and not all possible implementations. Thus the particular choice of drawings is not intended to limit the scope of the present disclosure.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description.

Introduction

The disclosed aircraft flight envelope protection system uses flight path predictive techniques to provide unified, full-envelope protection, working across the entire spectrum of aircraft flight conditions to address a full spectrum of different types of hazards. Flight path predictions are computed continuously from the aircraft's current situation using a kinematic energy model. Plural predicted trajectories are calculated, each representing a different escape route that will recover from a hazard when the threshold or trigger point for that hazard is reached. The system respects different types of hazards, some dealing with innate aircraft properties, such as speed and altitude limits, and some dealing with external concerns, such as terrain and object avoidance. The disclosed aircraft flight envelope protection system is designed to work across all such threat envelope boundaries.

Although plural trajectories are calculated, the envelope protection system continually assesses, and deprecates trajectories that are not feasible in the aircraft's current situation. A deprecated trajectory is treated by the system as not viable, unless the aircraft's situation changes such that the deprecated trajectory again becomes viable. The disclosed protection system works in the background, and does not override or usurp the pilot's authority until only one viable predicted trajectory remains (all other predicted trajectories have been deprecated), and a threat is triggered. In this event, the protection system automatically deploys an autopilot mechanism to take evasive action to recover from the hazard condition. The protection system may also generate warnings to the pilot, but is preferably not dependent on the pilot to take recovery action once the one remaining viable trajectory reaches the trigger point.

Preferably, the predictive envelope protection system is configured to provide a non-binary spectrum of recovery actions, including a passenger-safe, soft-ride recovery at one end of the spectrum and a hard recovery at the other end of the spectrum. When required to avert imminent threat, the system triggers a hard recovery. However in less extreme situations, where there is more time to recover, the system triggers a soft recovery—a passenger safe, smooth recovery. When such soft recovery is triggered the system will optionally blend input from the pilot into the recovery algorithm, allowing the pilot to modify the recovery aggressiveness based on the pilot's skill and experience.

Figure 1:
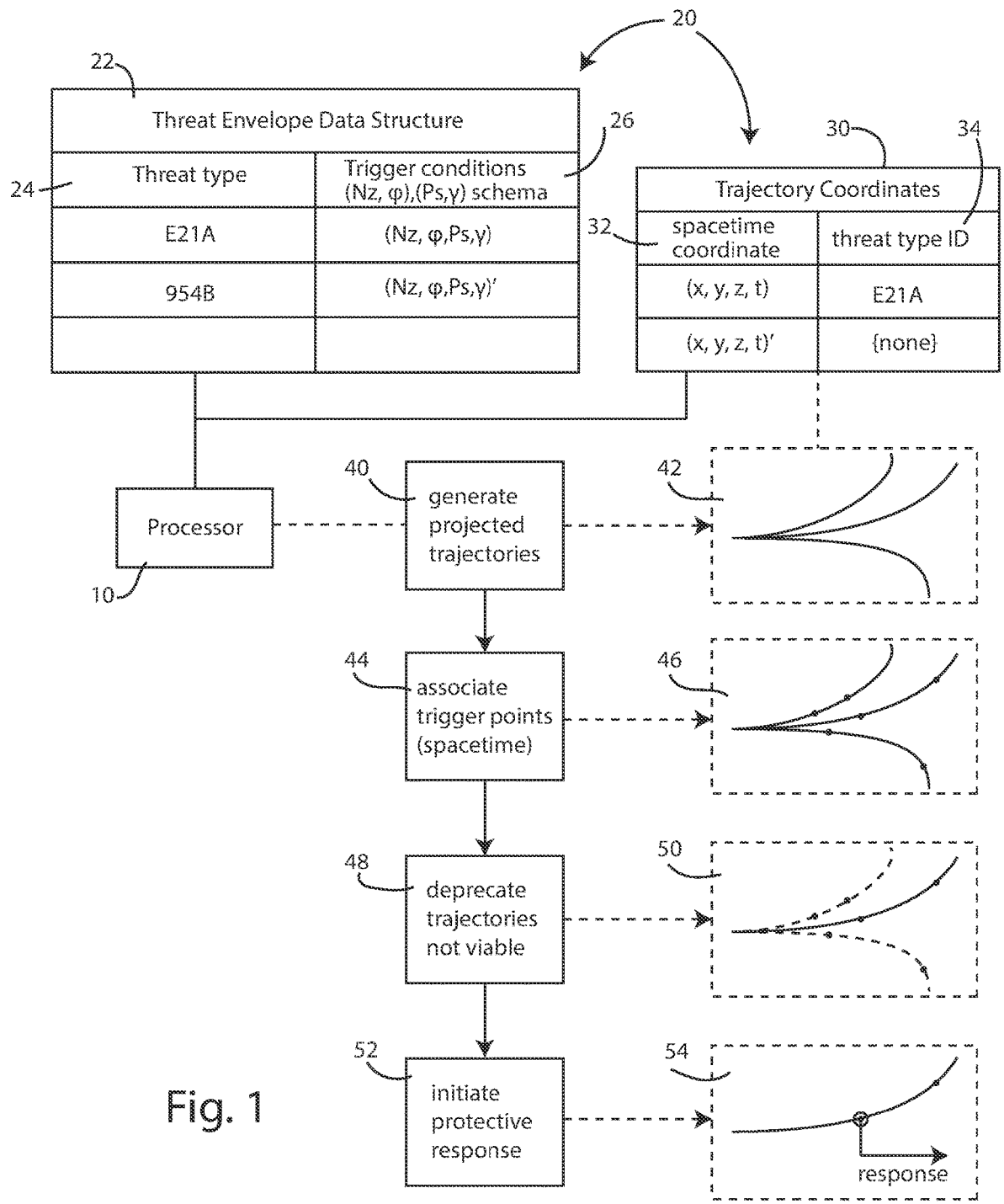
FIG. 1 is a block diagram illustrating the threat envelope and trajectory coordinates data structures, in conjunction with a processor programmed to performs steps to carry out the envelope protection function.

Referring to FIG. 1 an embodiment of the disclosed aircraft threat envelope protection system may be implemented using a processor 10 having an associated memory circuit 20 that is configured according to a predetermined threat envelope data structure 22 that stores a plurality of different types of threats associated with the aircraft 28. Preferably, the processor 10 and associated memory circuit 20 are carried by the aircraft. The data structure may comprise a table, list or matrix of records, each corresponding to a different threat type, shown in columnar form at 24 in FIG. 1. Each threat type 24 has a corresponding trigger condition stored at 26. These trigger conditions are parameterized using a common schema based on an n-dimensional threat space, and tell the processor 10 under what conditions the particular threat condition has been reached. Importantly, the common schema dimensions of the threat space are chosen so that a full spectrum of different threat conditions can be represented using a common, minimal set of fundamental variables. A presently preferred minimal set of fundamental variables is discussed below in the section entitled Kinematic-Energy Model.

The memory circuit 20 is also configured to support a trajectory coordinates data structure 30 that stores plural trajectories in terms of the spacetime coordinate variables 32. For illustration purposes, the spacetime coordinate variables have been identified using a rectangular coordinate system (x, y, z, t). Other coordinate systems (e.g., spherical) may also be used.

Generating Projected Trajectories

The trajectory coordinates data structure is populated with a sequence of spacetime coordinate variables (separately for each projected trajectory being modeled) that lie on and thus define the recovery trajectory shape in spacetime. To illustrate, the processor 10 is programmed to perform the generate the projected trajectories step, at 40, which results in a plurality of projected recovery trajectories being defined in terms of the spacetime coordinates, as illustrated in the spacetime illustration at 42. Each projected trajectory is computed, taking the current state of the aircraft as the starting point and assuming that each recovery maneuver is initiated at that moment.

In the example illustrated here, three projected trajectories are generated by processor 10. For the remainder of this disclosure three projected trajectories will be illustrated. In a given implementation, different numbers of trajectories may be used to define the working set of plural trajectories. In a commercial or business jet aircraft, three projected trajectories will normally be suitable to support smooth, passenger safe recoveries from threats. For aircraft, such as military aircraft, that may be required to fly inverted or in close proximity to the nape of the earth, a larger number of projected trajectories may be desirable.

There are different ways for the processor to determine the spacetime shapes of each of the plural trajectories. In one embodiment the trajectory spacetime shapes follow a standardized set of predefined solution curves, corresponding to a set of known hazard recovery maneuvers that are appropriate for the class of aircraft for which the protection system is designed. Typically these solution curves are based on what a trained pilot would likely fly to recover from the particular hazard. These might include, for example. a standard set of pull-up, dive, turn left and turn right maneuvers, where the specific parameters (e.g., climb and bank angles) are chosen to maximize passenger safety and comfort. In some implementations compound recovery maneuvers may be used, where different classes of maneuvers are concatenated together. For example, a business jet might employ a compound maneuver where a final climb maneuver is preceded by a zoom maneuver to exchange excess airspeed for altitude while capturing the optimum steady state climb. In this embodiment a standardized set of a relatively small number of predefined solution curves (e.g., three projected trajectories) is sufficient for many types of aircraft, including business jets. Working with a relatively small number of solution curves and a small number of fundamental kinematic-energy variables, places a minimal load on the processor. Because the trajectories are continually being recomputed, the system produces good results, even though the solution set has been reduced to only a few projected trajectories, based on a few fundamental variables. Of course, if higher resolution is required for a particular aircraft application, the processor can be programmed to compute a greater number of trajectories, and the calculations can be expanded to support additional variables. Parallel processing techniques and programmable gate array circuit components may be utilized to enhance or replace processor 10 if greater throughput is required.

As an alternative to generating projected trajectories from a small, standardized set of predefined solution curves, the processor can be programmed to select from a stored collection of different families of predefined solution curve sets, each family being designed for optimal recovery from a particular type or class of threat. Thus the solution curve family chosen for recovery from a stall hazard might be different from the solution curve family chosen for recovery from a service ceiling hazard. To assess which family of solutions to employ, the processor can project the current aircraft state onto the n-dimensional threat space to determine which threat family is most proximate to the current aircraft state. In so doing, the processor determines in real time which threat is most pressing and then bases the projected trajectory models on the family of predefined solution curves that is best suited under current circumstances.

Associating Threat Trigger Points to Each Potential Trajectory

Either in parallel as the trajectories are being generated, or serially after the trajectories have been generated, the processor, at step 44, associates applicable trigger points, corresponding to threats identified within the threat envelope data structure, to points in spacetime along each of the projected trajectories. For any given trajectory, initially there may be no detected threats. However, as the aircraft continues to fly and the trajectories are continually recomputed, at some point in time a threat may be detected and this threat (first detected in time) will be associated as a trigger point on each of the trajectories where applicable. As diagrammatically represented in the spacetime illustration at 46, these trigger points represent points along the spacetime trajectory when the aircraft will reach the threat response margin for which evasive or recovery action should be initiated.

It is worth emphasizing again that the generated projected trajectories represent different hypothetical trajectories that the pilot (or an automated system) might elect to follow. Because each of these trajectories is being continually generated, they all represent possible future states of the aircraft. The current state of the aircraft lies at the starting point or singularity from which the projected future trajectories diverge. So long as there are plural projected trajectories available, the pilot remains free to follow whatever course he or she desires. Whatever course the pilot elects to fly, the processor 10 merely re-computes its solutions for the predetermined future trajectories.

Deprecating Projected Trajectories that are Not Viable

As the aircraft continues to fly, and as the projected trajectories are continually recomputed, there may be instances where a given trajectory becomes no longer viable. This can happen, for example, when the aircraft lacks sufficient energy to perform the projected trajectory maneuver, or when the projected trajectory maneuver will result violate a speed limit which could potentially damage the aircraft. This can also happen if the projected trajectory places the aircraft on a collision course with a material object with a momentum sufficient to damage the aircraft. The processor 10, at step 48, evaluates each of the projected trajectories on this basis, and decommissions or deprecates any trajectory that is no longer viable. In FIG. 1 at 50, two of the projected trajectories are shown in dotted lines to indicate that they have been deprecated.

Trajectories that have been deprecated are not used in a subsequent protective response. However, because the trajectory solutions are continually being updated by the processor, a deprecated trajectory could return to viability if the condition that caused it to be deprecated is lifted. For example if a trajectory was deprecated because it put the aircraft on collision course with another aircraft, and the other aircraft has since moved out of collision range, the processor will reinstate that trajectory as viable by removing its deprecation state.

Initiating a Protective Response

As illustrated at 52, if the processor reaches a state where only one viable trajectory remains (all others have been deprecated), the processor initiates a protective response. This response can include sending a warning or alert message to the pilot, which the pilot may heed or not. Whether heeded or not, the protective response initiated by the processor is designed to set the aircraft on a computed trajectory that will avoid or escape from the first-encountered threat (if plural threats lie on the computed trajectory). To accomplish this the processor sends one or more commands to an autopilot system, the details of which will be discussed below.

Figure 5:
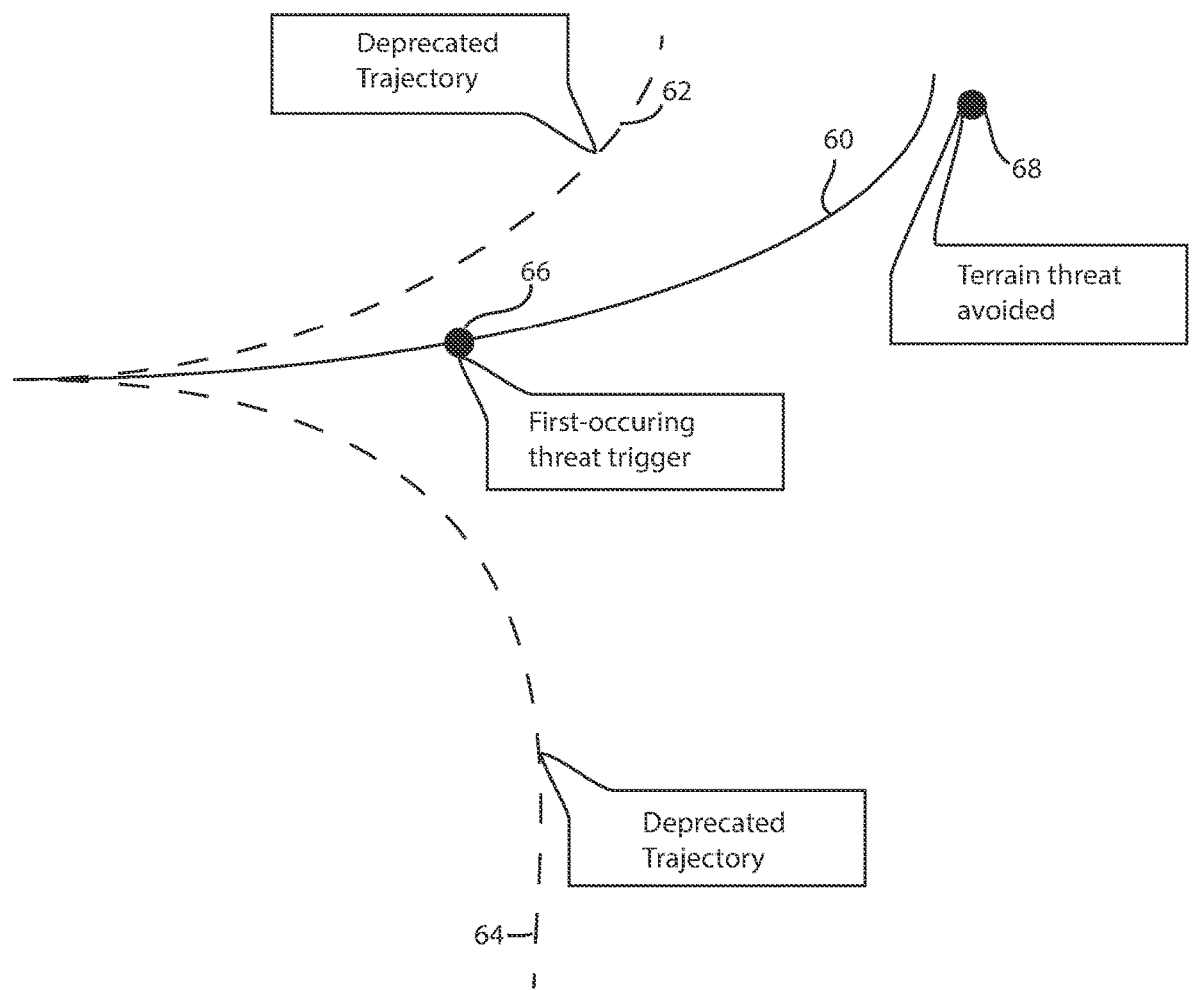
FIG. 5 is a detailed view of one viable and two deprecated trajectories, illustrating how the first-encountered trigger is used to initiate an aircraft protective response.

FIG. 5 illustrates this important hazard recovery response protocol in greater detail. As shown, one trajectory 60 remains viable, while trajectories 62 and 64 have been deprecated. Along the viable trajectory 60, the first-occurring threat 66 triggers the protective response to be initiated. When initiated, the aircraft flies according to the projected trajectory. In effect the projected trajectory becomes the actual trajectory instance that the aircraft will fly, subject to later changes (if any) from a subsequent iterative update of the projected trajectory. As illustrated the projected trajectory is precomputed to clear any terrain threat, such as at 68. Thus when triggered by the first occurring threat at 66 (which could be for example, a speed violation due to a nose-low condition) the recipe used to compute the shape of the projected trajectory is designed to avoid the terrain threat at 68.

Kinematic-Energy Model

The presently preferred, minimal set of fundamental variables used by processor 10 relies upon a kinematic-energy model that defines a predictive trajectory in terms of the aircraft's physical position, its energy state, and the forces acting on the aircraft that affect trajectory. In this regard forces normal to the aircraft's longitudinal axis (normal forces) change the trajectory direction, while forces tangential to the aircraft's longitudinal axis (tangential forces) change the aircraft's velocity along that trajectory.

Figure 2:
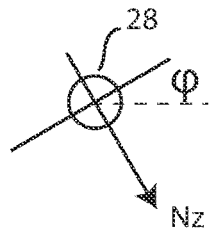
FIG. 2 is a schematic representation of an aircraft, useful in understanding certain force vectors and angles used by the disclosed common schema and kinematic-energy models.

In one embodiment the common schema for the n-dimensional threat space can be represented by a minimal set of fundamental variables, $N_z$, $\phi$, $P_s$ and $\gamma$. As shown in FIG. 2, $N_z$ represents the normal force (force acting normal or perpendicular to the longitudinal axis of the aircraft). In FIG. 2, the longitudinal axis of the aircraft 28 is directed into the page. This normal force $N_z$ also represents the g-force acting on the aircraft. When the aircraft is flying in a level, steady state condition, the g-force acting on the aircraft is the force of gravity. However, when the aircraft is flying with a non-zero bank angle $\phi$ the g-force orientation is changed.

Figure 3:
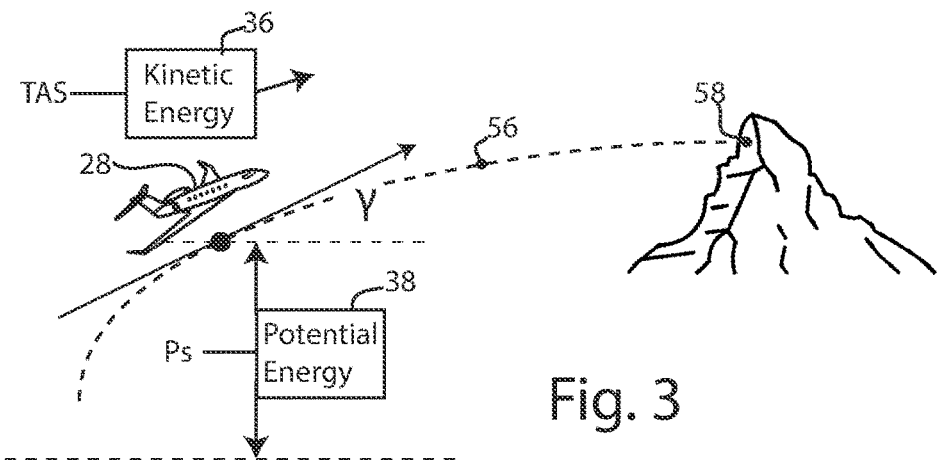
FIG. 3 is a schematic representation of an aircraft, useful in understanding certain energy values used by the common schema and kinematic-energy models, and also showing a projected trajectory with exemplary energy and matter threats.

Illustrated in FIG. 3, the energy state of the aircraft 28 comprise two components: kinetic energy 36, related to the velocity of the aircraft ($KE = \frac{1}{2} mv^2$ where m is aircraft mass and v is velocity), and potential energy 38, the energy available to produce acceleration. The potential energy includes an aircraft altitude component—potential energy increases with altitude ($PE = mgh$ where m is aircraft mass, h is aircraft altitude and g is the gravitational constant)—and a portable stored energy component representing the amount of additional thrust that can be developed by increasing the power output of the engines. While there are many measurable variables that can be used to calculate the kinetic and potential energy of the aircraft, in one embodiment the kinetic energy 36 is derived from the true air speed (TAS); the potential energy 38 is derived from the aircraft altitude, specific excess power $P_s$ (available thrust power minus drag power) and the flight path angle $\gamma$. The specific excess power $P_s$ is normalized to be independent of the aircraft weight, making $P_s$ a weight-independent energy term. A value $P_s=0$ signifies that there is no excess power available, meaning every bit of power is simply overcoming the drag. In the $P_s=0$ condition, the aircraft can still accelerate by flying nose down, or can still decelerate by flying nose up. This effect is accounted for by the γ term, which represents the flight path angle (nose-up, nose-down angle). When a non-zero γ angle is invoked, kinetic energy and potential energy are exchanged: a nose-up γ angle gives up some kinetic energy to increase potential energy; conversely, a nose-down γ angle gives up some potential energy to increase kinetic energy.

Figure 4:
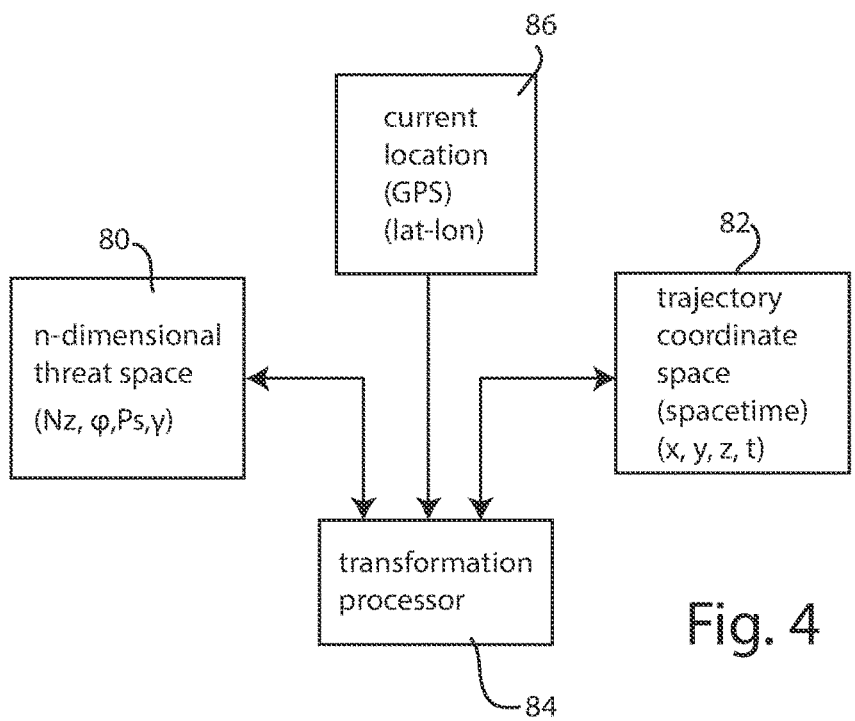
FIG. 4 is a data model block diagram showing the relationship between the n-dimensional threat space and the trajectory coordinate space (spacetime)

These variables may be used both to represent threats within the n-dimensional threat space 80, shown in FIG. 4 and may also be used to calculate the aircraft's position and energy state at future positions in spacetime along a projected trajectory by using kinematic-energy relationships to transform data between the n-dimensional threat space 80 and the trajectory coordinate space 82. The kinematic-energy relationship transformations are performed by the transformational processor 84, which may be implemented by programming processor 10 with the kinematic-energy relationships that relate aircraft $P_s$, $N_z$, ϕ, and γ threat space values to the aircraft trajectory coordinates in spacetime (x, y, z, t).

The disclosed predictive aircraft threat envelope protection system is able to provide full envelope protection because of its unique data model that can represent all threats using a common schema employing a minimal set of fundamental variables. As illustrated in FIG. 4 the disclosed threat envelope protection system, in essence employs a kinematic-energy data model based on a minimal set of variables and processor component that ties key components of the data model together. One key component of the data model defines the n-dimensional threat space 80 by which all threats are representing using a pair of force variables (Nz, ϕ) and a pair of energy state variables (Ps, γ). The threats to be protected against that are known a priori are pre-populated into the threat envelope data structure 22 (FIG. 1). Threats known a priori would include, for example threats relating to different energy limits, such as stall limits, overspeed limits and under-speed limits. Some of these limits are known at the aircraft design time, while other limits are calculated during flight.

Another key component of the data model defines the trajectory coordinate space in terms of spacetime variables (x, y, z, t). Some threats, such as terrain objects and other aircraft (both examples of physical matter that occupy space) in the vicinity are more readily represented in coordinate space, based on the object's position. For example the system may utilize map data to store the physical location of terrain structures such as mountains that may be encountered during flight. The system is able to model both energy threats and matter threats. To illustrate, in FIG. 4 two threats lie on the aircraft trajectory, an energy threat 56 (which could be, for example, an aircraft stall limit) and a matter threat 58 (which could be a terrain object, such as a mountain).

To tie these two data model components together, processor 10 (FIG. 1) is programmed with the necessary kinematic equations to function as a transformation processor 84 that uses the current aircraft location 86, obtained from suitable sensor such as GPS, and the force variables and energy state variables within threat space 80, to calculate the projected trajectories in trajectory coordinate space 82. If needed, the transformation processor can also project points in trajectory coordinate space 82 into threat space 80, to assess for example whether the current or projected future location of the aircraft intersects with envelope threat limits.

Full-Envelope Protection

Full envelope protection provided by the disclosed aircraft flight envelope protection system involves two related aspects: (1) the protection afforded by the disclosed system covers all circumstances, not just the most common hazards; and (2) the disclosed system handles plural different threat conditions concurrently. It is not limited to a singular threat. To illustrate the first aspect, the system is designed to provide protection in all circumstances not just in the heart of the flight envelope or for the most common hazards. For example, a conventional overspeed protection system only works while near wings level. At very high bank angles, the overspeed protection is suppressed. The reason for this is logical. The overspeed protection works by pulling the nose up to help slow the aircraft. If the aircraft was at a very high bank angle, inverted for example, pulling the nose up can exasperate the problem instead of alleviating it. The full envelope protection afforded by the disclosed system does not have such limitations and works across the entire spectrum of aircraft flight conditions.

To illustrate the second aspect, the system is designed to provide full protection against all threats not just a single threat. In a conventional enhanced ground proximity warning system (TAWS), for example, protection is provided against ground impact. However low speed protection is not provided—a separate low-speed protection system is conventionally provided for that. In contrast, the disclosed aircraft flight envelope protection system provides protection against all threats in a single system. Handling all threats in a single system avoids conflicts that can arise with a collection of federated systems.

To illustrate, there have been mishaps involving aircraft equipped with TAWS and low speed protection that have hit the ground at slow speed. The problem is that federated systems are not cognizant of other systems assumptions. In the example case, the aircraft was flying at a slow speed, but the low speed protection was not triggered because the speed was not close to stall, although the speed was slow enough to prevent an immediate climb. The ground proximity system was not triggered because the aircraft was on descent to a runway and the system assumed that climb capability existed. Neither system was aware of the other system's proximity to a threat and the assumptions that the other systems made regarding speed and altitude. The disclosed aircraft flight envelope protection system provides a seamless comprehensive system that provides protection against all threats with full awareness of all relevant parameters.

Predictive Envelope Protection

Traditional envelope protection systems use rules of thumb, based on assumptions, to determine when an alert must be generated to alert the crew of an impending envelope excursion. For cases close to the assumed design case, these systems can work reasonably well. However, for cases markedly different from the design point, the system performance degrades or fails completely. Consider again the conventional TAWS, which uses rules of thumb exclusively.

Figure 6A:
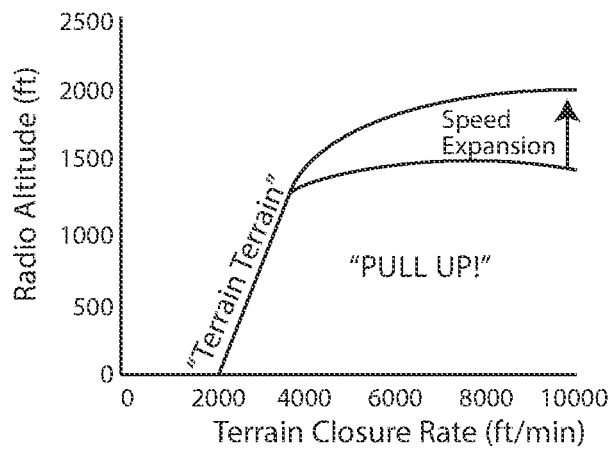
FIG. 6A is a graph of aircraft altitude vs terrain closure rate, illustrating regions where different pilot alert messages are commonly generated in prior art systems.
Figure 6B:
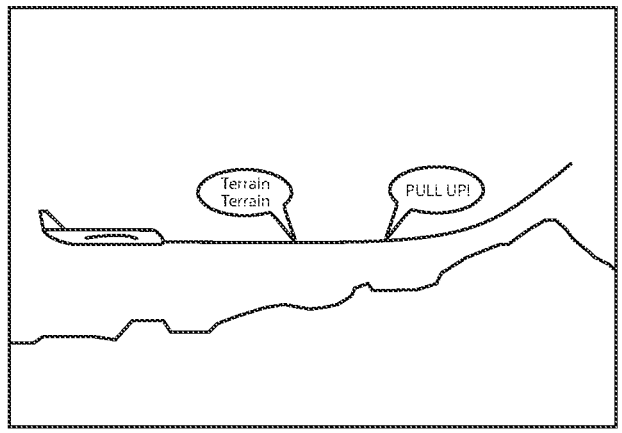
FIG. 6B is a diagram of an aircraft flying above terrain, illustrating where prior art systems will typically issue different pilot alert messages, in the desired case where assumptions about terrain slope are reliable.

An exemplary conventional TAWS system is illustrated in FIG. 6A. This conventional TAWS uses radio altimeter altitude and rate of change to determine timing of the pull-up alert. Under nominal conditions, illustrated in FIG. 6B, the alert will sound at a point that is not so early as to be a nuisance, but early enough for the pilot to react and initiate a climb that will clear the rising terrain. The accuracy of this method is dependent on two factors.

Figure 6C:
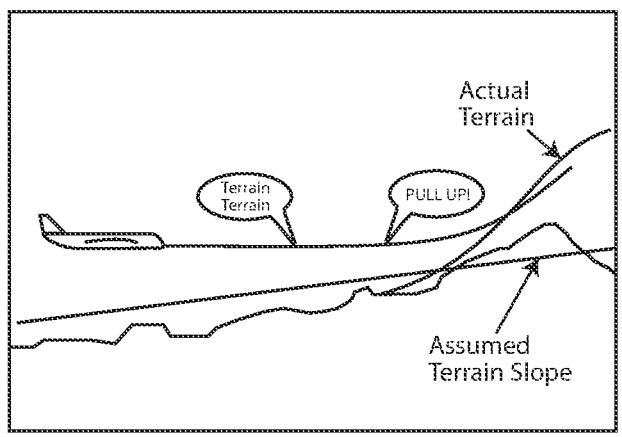
FIG. 6C is a diagram of an aircraft initially flying above terrain, illustrating where prior art systems will typically issue different pilot alert messages, in the undesired case where assumptions about terrain slope do not comport with the actual terrain, such that terrain collision is not avoided by the prior art system.

First, the terrain in front of the aircraft must match reasonably well with the terrain currently being measured. The system looks at current terrain clearance and rate of change of that terrain; but if the terrain slope changes, clearance may not be assured. FIG. 6C illustrates what would happen if the terrain slope varied markedly from current slope. FIG. 6C shows that if the terrain slope increases in front of the aircraft, terrain clearance may not be assured.

Second, the accuracy of this type of conventional system depends on the ability of the aircraft in its current configuration being able to fly the expected profile. Looking again at FIGS. 6A-6C, the illustrated aircraft trajectory is assumed to be able to pull up above the rising terrain. This is an assumption that may or may not be accurate. The conventional TAWS system does not consider high altitude terrain where climb performance is significantly less than at sea level. It does not consider gross weight effects or engine failure conditions. The nominal case may not extend to the entire envelope. In contrast, the disclosed predictive system does not rely on precomputed rules of thumb, but instead looks at the current conditions to predict climb performance. In the disclosed predictive system, the actual terrain in front of the aircraft is used and the actual climb capability is used. In order to accomplish this, the significant factors affecting the climb capability of the aircraft are considered in real time and the actual terrain profile is compared to the current climb capability to determine an accurate warning initiation. While all factors affecting climb capability could be considered, in a practical embodiment it is usually only necessary to consider enough factors to ensure an adequate level of fidelity; insignificant factors having little impact can be excluded.

Kinematic Energy-Methods Modeling

As discussed above, the disclosed predictive aircraft flight envelope protection system uses kinematic modeling that focuses concern only with what happens and not why it happens. The disclosed system computes the relevant predictive trajectory from the physical position of the aircraft and its energy state. The disclosed system is not concerned with the forces or moments that cause that motion but only what the motion is. As a result, parameters such as elevator effectiveness, static longitudinal stability, short period frequency and damping ratio and many other parameters are of no significance. To predict a future trajectory, the disclosed predictive system only needs to concern itself with the forces that affect that trajectory.

In this regard, normal forces change trajectory direction and tangential forces change velocity along that trajectory. With that in mind, the disclosed system models a 3-D trajectory very well by looking only at $P_s$, $N_z$, $\phi$, and $\gamma$. Vertical trajectory is dependent only on the vertical component of $N_z$ which can be modeled easily using the aircraft's current configuration and flight conditions. Simplified modeling using an $N_z$ onset rate and a steady state $N_z$ is more than sufficient to accurately model the trajectory. Horizontal trajectory is dependent only on the horizontal component of $N_z$. Bank angle determines the distribution of $N_z$ into vertical and horizontal components and roll can be modeled adequately using a roll onset rate and a steady state roll rate derived from current aircraft configuration and flight conditions.

The velocity change that occurs along the trajectory is dependent only on the vertical component of the trajectory and the $P_s$ of the aircraft at the time. $P_s$ is specific excess power and it tells the system how much excess power an aircraft has that can be used to climb or to accelerate. If the aircraft is in level flight and $P_s$ is equal to zero, the aircraft will maintain current velocity. If $P_s$ is +100 ft/sec, it will accelerate in level flight. If it is +100 ft/sec but the aircraft is in a climb at 100 ft/sec, the aircraft will climb while holding constant airspeed. By using the current climb and the climb capability expressed in feet per second, the future velocity state of the aircraft can be accurately predicted. FIG. 3 illustrates a single iterative step in the modeling routine that uses kinematic modeling and energy-methods.

Rapid Computation Modeling

The predictive method described above can be computationally intensive to perform real time so some techniques developed for the disclosed embodiment can be helpful. First, accurate predictions of future airspeed are necessary to perform airspeed envelop protection. Computing calibrated airspeed (CAS) and Mach from the modeled true airspeed (TAS) can be computationally intensive. Computing accurate Ps can also be quite intensive. One technique to address these computational issues is to use a table lookup function. Another method is to perform a linear or second order curve fit of Ps as a function of altitude for the nominal case (250KCAS, Mid weight, STD . . . ) and then adjust that for off-nominal conditions using Ps debits. Such debits include, a debit for airspeed (as a function of altitude), a debit for Speed brakes, a debit for Single Engine, a debit for no standard day temp, etc. These can be added/subtracted from the computed debit. Many of the parameters can be computed only once during the modeling. For example, the latitudinal and longitudinal wind drift for each iteration of the model can be precomputed and used for each iteration that follows as the wind drift will be the same.

Multi-Trajectory

The disclosed predictive system is a multi-trajectory system that in one preferred embodiment uses 3 primary trajectories to predict a warning/recovery initiation time. Another embodiment, capable of recovery from aircraft inverted (upside-down) conditions, uses 6 primary trajectories. Before discussing multiple trajectories, first consider a single predictive trajectory system and how that would be implemented into a warning system. For a single predictive trajectory system, the system would look at current state and then assume a recovery would be initiated at that moment. The predictive recovery would then be modeled and tested for proximity to protected threats. For example, if the aircraft were in a dive toward the ground, the system would predict what the nose low recovery would look like and test that trajectory for proximity to both airspeed limits and terrain. If no limits were exceeded and the margins were acceptable, no warning would be issued. If limits were exceeded or margins unacceptably small, a recovery warning would be triggered "PULL-UP" for example. In many cases, a single trajectory is sufficient. In the nose low case against flat terrain, there is really only one good way to recovery and that is to roll wings level, reduce power and pull to recovery Nz until clear of the terrain and airspeed limits.

The reason for supporting plural predictive trajectories (e.g., 6 trajectories in one preferred embodiment) can be illustrated by a second example in which the aircraft is flying level toward a single butte in the desert. In such a case, there are two predictive trajectories that might be used. The pilot could avoid the butte by turning left or right to avoid it, or by staying on course and climbing above it. This raises the question, at what point should the system initiate a "PULL UP" warning? Perhaps not at all if a level turn is best. The solution to this problem is to use multiple trajectories. Since the pilot has multiple escape options, the system models each of those options. In the butte example, the system would model three trajectories, a left turning trajectory, a right turning trajectory, and a climbing trajectory. If a single trajectory violates a limit or has insufficient margins but the others are clear, no warning is issued as the pilot still has margin for another option. A warning is only issued when there is only one viable trajectory and that trajectory reaches a trigger point. So in the butte example, if the left and right turn are ruled out, a "PULL UP" will be issued when the climbing trajectory margins fall below a desired threshold. If due to a different approach or type of terrain, the climbing trajectory is ruled out, a "TURN LEFT" or "TURN RIGHT" warning will be issued when the respective trajectory is the last available and has reached its trigger margin.

Once again, because pilots have multiple escape options, a 100% nuisance free system that provides 100% protection MUST contemplate (and model) all possible escape options. In a practical embodiment a system would not typically model all options—representative examples of each different type of trajectory solution is usually sufficient. For example, in the butte case, it was possible to do a climbing right turn at 10 degrees bank, a climbing right turn at 15 deg bank etc. Each trajectory can be adjusted a tiny amount creating an infinite number of possible trajectories. However, the 30 degree and 29 degree bank trajectories are functionally indistinguishable. Therefore, it is only necessary to model the entire range of recoveries with enough graduation to prevent nuisance warnings. We have determined that for business jets very good results are obtained using a minimum of three trajectories for terrain avoidance and a single trajectory for speed limits. Exemplary trajectories for one embodiment include a level climb, and 30 degree bank left and right climbing turns. Seven (7) trajectory and infinite trajectory systems may also be employed. These greater numbers of trajectories may have utility in military systems, for example, that require nape of the earth nuisance free operation.

While three (3) primary trajectories represent a minimal set, a better implementation is based on six primary trajectories. The reason for this is that we cannot assume that each of the three trajectories mentioned above can be initiated immediately. A level climb, for example, may need to be preceded by a nose high recovery to attain climb speed before initiating the steady climb. Here the three final climbs are referred to as the final climb or the direct climb. For some systems, the aircraft is always in a position to go directly into the final steady state climb. In business jets, the final climb will likely be preceded by a zoom to trade excess airspeed into altitude while capturing the optimum steady state climb. In some cases a nose low recovery must be initiated first where power is left back to keep airspeed under control before reaching an attitude where power can be brought to full for the final climb. Because the aircraft can perform nose high recoveries in two directions and nose low recoveries in two directions (rolling in shortest direction to level or rolling through the vertical to level) there are six total trajectories.

Above, the six trajectories are designated as primary trajectories. If desired, an embodiment may also support additional trajectories to accomplish other purposes. For example, once the preferred trajectory is found, it can be run again using a two-second pilot delay to help determine a more precise warning initiation. Also, if desired, the preferred trajectory may be computed again using a more aggressive recovery model. This more aggressive recovery model is then blended with the originally calculated preferred trajectory, to help blend between soft ride and hard ride recovery options.

Automatic

The predictive aircraft flight envelope protection system is a fully automatic system, which means that it does not rely on pilot intervention. While it can provide and probably should provide a warning to the pilot, the system is automatic and not dependent on the pilot heading that warning to provide protection. This requires a few additional considerations. First, we need a system to give effect to the predictive warning. An auto-pilot of some form needs to be implemented that executes an envelope protecting maneuver. That auto-pilot should have full authority over roll and pitch as well as speedbrake and throttle. Further, since the system must operate in one-engine-inoperative (OEI) cases, the auto-pilot must be able to handle asymmetric thrust conditions. The solution provided by the disclosed system is to add thrust compensation into the basic aircraft control laws. As a result, even when an avoidance is not in progress, the aircraft behaves as if the thrust lines of both engines were along the centerline of the aircraft. In a one embodiment, the N1 difference between engines is used to schedule compensating rudder. There are other recognized methods of thrust compensation that can be used as an alternative to N1.

A second necessary feature of an automatic system is that it must be much more resistant to failures and corrupted sensors than a manual system. With a manual system, the false warning can be easily ignored. With an automatic system, it cannot be ignored and therefore the resistance to false warnings must be significantly higher. The disclosed system thus provides multiple-redundant sensors combined with monitor circuits that determine when a sensor has failed or is suspect, and voter circuits that determine what sensor value is reported to the system when there is some variation between the multiple-redundant sensors.

Finally, the automatic system allows pilot input to be blended with the control provided by the system. In previous systems of this nature (e.g., legacy automatic ground collision avoidance systems used in military applications), the recovery is typically always nearly the maximum capability of the aircraft. The reasons for this derive from performance required for military applications, where nuisance free extreme low level operation (nape of the earth operation) was required without regard to ride quality. In a business jet, the opposite is true. Extreme low level, nape of the earth operations are not required and ride quality for passengers is of paramount importance. As a result, the preferred recovery for a business jet is typically nowhere near the maximum performance capability of the aircraft.

The smooth, passenger safe recovery does create challenges, however. First, during upsets when a jet wake flips an aircraft upside down or a wind shear throws the aircraft toward the ground, a smooth, passenger safe recovery will not suffice. In these extremely rare "Act of God" cases, it is irrelevant how the aircraft got there; it is paramount to recover the aircraft, using all available control power. Second, there are instances where an automatic recovery initiates but during the recovery, the pilot becomes aware of how close to the ground he really is and wishes to increase the terrain margin by increasing performance of the recovery. In this case, the system will permit the pilot to increase recovery aggressiveness by blending pilot input with the calculated smooth, passenger safe recovery. Thus the system flexibly handles the extremes where the smooth, passenger safe recovery may not be appropriate: in one case allowing the system to automatically increase recovery aggressiveness, and in another case allowing the pilot to do so. To address these cases, the system implements a non-binary control system that will be described next.

Non-Binary

In a binary system, the auto-recovery or warning is either on or off, there are no middle states. As mentioned previously, the disclosed automatic system designed for business jet requires more. The solution is a non-binary system. In the disclosed system, the smooth, passenger safe soft ride is used but pilot blending is allowed and the soft ride will automatically blend into a harder and harder recovery if the margins degrade or fail to improve. One way to accomplish this is by comparing the soft ride preferred trajectory to the hard ride trajectory in the same direction and blending a nudger/fader based on that comparison. Other methods can be used where the margins to the limits can be used to drive the blending. For example, the processor can assess if a smooth ride fails to achieve the margins desired. In such case the trajectory predicting algorithm incrementally increases aggressiveness and directs an increasingly more aggressive recovery in response. The nudger/fader design should be built such that pilots can aid the recovery but are progressively prevented from degrading the recovery when margins are small.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment as contemplated herein. It should be understood that various changes may be made in the function and arrangement of elements described in an exemplary embodiment without departing from the scope of the invention as set forth in the appended claims.

What is claimed is:

1. A method of providing aircraft threat envelope protection for an aircraft, comprising:
   populating a threat envelope data structure embodied in a computer-readable medium to store a plurality of trigger conditions, each of the plurality of trigger conditions associated with at least one threat of a plurality of different types of threats associated with the aircraft;
   iteratively generating projected trajectories of the aircraft, where at each iteration a plurality of projected trajectories are generated, with each iteration of the plurality of projected trajectories describing different possible aircraft paths through spacetime that each begin at a current aircraft state;
   responsive to a detected threat of the plurality of different types of threats, associating a trigger condition of the plurality of trigger conditions to a specific trigger point in spacetime along at least one of the plurality of projected trajectories, where the specific trigger point identifies where in spacetime a recovery action should be initiated based on the trigger conditions associated the detected threat;
   deprecating selected projected trajectories of the plurality of projected trajectories during conditions when such selected projected trajectories are computed as not viable to recover from any detected threat of the plurality of different types of threats; and
   initiating an aircraft protective response in response to:
      all but one of the plurality of projected trajectories having been deprecated such that only one non-deprecated projected trajectory remains viable; and
      the aircraft is within a determined proximity to a closest trigger point of the one or more specific trigger points along the one non-deprecated projected trajectory.

2. The method of claim 1 further comprising updating the specific trigger point when a subsequent iteration of the plurality of projected trajectories is generated.

3. The method of claim 1 wherein each of the plurality of different types of threats is parameterized using a common schema in the threat envelope data structure.

4. The method of claim 3 wherein the common schema expresses each of the plurality of different types of threats in terms of (a) a force affecting trajectory of the aircraft and (b) an energy state of the aircraft.

5. The method of claim 3 wherein the common schema expresses each of the plurality of different types of threats in terms of a g-force vector and an energy state vector.

6. The method of claim 3 wherein the common schema expresses each of the plurality of different types of threats in terms of (a) a force normal to the longitudinal axis of the aircraft, (b) an aircraft bank angle, (c) an excess specific power of the aircraft, and (d) a flight path angle.

7. The method of claim 3 wherein each of the plurality of projected trajectories is expressed in terms used by the common schema.

8. The method of claim 1 wherein the threat envelope data structure stores at least one of the plurality of trigger conditions associated with an energy boundary.

9. The method of claim 1 wherein the threat envelope data structure stores at least one of the plurality of trigger conditions associated with a matter boundary.

10. The method of claim 1 wherein the aircraft protective response is selected from the group consisting of issuing an alert message to an aircraft pilot, issuing a control command to an autopilot system and combinations thereof.

11. An aircraft protection system, comprising:
   a threat envelope data structure embodied in a computer-readable medium populated to store a plurality of trigger conditions, each of the plurality of trigger conditions associated with at least one threat of a plurality of different types of threats associated with an aircraft; and
   a processor coupled to the computer-readable medium, the processor programmed with instructions to:
      iteratively generate projected trajectories of the aircraft, where at each iteration a plurality of projected trajectories are generated, with each iteration of the plurality of projected trajectories describing different possible aircraft paths through spacetime that each begin at a current aircraft state;
      responsive to a detected threat of the plurality of different types of threats, associate a trigger condition of the plurality of trigger conditions to a specific trigger point in spacetime along at least one of the plurality of projected trajectories, where the specific trigger point identifies where in spacetime a recovery action should be initiated based on the trigger conditions associated the detected threat;
      deprecate selected projected trajectories of the plurality of projected trajectories during conditions when such selected projected trajectories are computed as not viable to recover from any detected threat of the plurality of different types of threats; and initiate an aircraft protective response in response to:
    all but one of the plurality of projected trajectories having been deprecated such that only one non-deprecated projected trajectory remains viable; and
    the aircraft is within a determined proximity to a closest trigger point of the one or more specific trigger points along the one non-deprecated projected trajectory.

12. The aircraft protection system of claim 11 wherein the processor is further programmed with instructions to update the specific trigger point when a subsequent iteration of the plurality of projected trajectories is generated.

13. The aircraft protection system of claim 11 wherein each of the plurality of different types of threats is parameterized using a common schema in the threat envelope data structure.

14. The aircraft protection system of claim 13 wherein the common schema expresses each of the plurality of different types of threats in terms of (a) a force affecting trajectory of the aircraft and (b) an energy state of the aircraft.

15. The aircraft protection system of claim 13 wherein the common schema expresses each of the plurality of different types of threats in terms of a g-force vector and an energy state vector.

16. The aircraft protection system of claim 13 wherein the common schema expresses each of the plurality of different types of threats in terms of (a) a force normal to the longitudinal axis of the aircraft, (b) an aircraft bank angle, (c) an excess specific power of the aircraft, and (d) a flight path angle.

17. The aircraft protection system of claim 11 wherein the threat envelope data structure stores at least one of the plurality of trigger conditions associated with an energy boundary.

18. The aircraft protection system of claim 11 wherein the threat envelope data structure stores at least one of the plurality of trigger conditions associated with a matter boundary.

19. The aircraft protection system of claim 11 wherein the aircraft protective response is selected from the group consisting of issuing an alert message to an aircraft pilot, issuing a control command to an autopilot system and combinations thereof.

20. An aircraft protection system, comprising:
    a threat envelope data structure embodied in a computer-readable medium populated to store a plurality of trigger conditions, each of the plurality of trigger conditions associated with at least one threat of a plurality of different types of threats associated with an aircraft, wherein each of the plurality of different types of threats is parameterized using a common schema in the threat envelope data structure; and
    a processor coupled to the computer-readable medium, the processor programmed with instructions to:
        iteratively generate projected trajectories of the aircraft, where at each iteration a plurality of projected trajectories are generated, with each iteration of the plurality of projected trajectories describing different possible aircraft paths through spacetime that each begin at a current aircraft state;
        responsive to a detected threat of the plurality of different types of threats, associate a trigger condition of the plurality of trigger conditions to at least one specific trigger point in spacetime along at least one of the plurality of projected trajectories, where the at least one specific trigger point identifies where in spacetime a recovery action should be initiated based on the trigger conditions associated the detected threat;
        iteratively update the at least one specific trigger point when a subsequent iteration of the plurality of projected trajectories is generated;
        deprecate selected projected trajectories of the plurality of projected trajectories during conditions when such selected projected trajectories are computed as not viable to recover from any detected threat of the plurality of different types of threats; and
        initiate an aircraft protective response in response to:
            all but one of the plurality of projected trajectories having been deprecated such that only one non-deprecated projected trajectory remains viable; and
            the aircraft is within a determined proximity to a closest trigger point of the one or more specific trigger points along the one non-deprecated projected trajectory;
        where the aircraft protective response is selected from the group consisting of issuing an alert message to an aircraft pilot, issuing a control command to an autopilot system and combinations thereof.

* * * * *